Patented Nov. 14, 1922.

1,435,794

UNITED STATES PATENT OFFICE.

GEORGE BECK, OF DETROIT, MICHIGAN, ASSIGNOR TO AMERICAN HOMINY COMPANY, OF INDIANAPOLIS, INDIANA, A CORPORATION OF NEW JERSEY.

COOKED CEREAL FOOD AND PROCESS OF PREPARING THE SAME.

No Drawing. Application filed August 4, 1919, Serial No. 315,213. Renewed October 7, 1922. Serial No. 593,123.

*To all whom it may concern:*

Be it known that I, GEORGE BECK, a citizen of the United States, residing at Detroit, in the county of Wayne and State of Michigan, have invented certain new and useful Improvements in Cooked Cereal Foods and Processes of Preparing the Same, of which the following is a specification.

This invention relates to cereal foods and has among its objects the production of a quick cooking oat food such as may be readily prepared in a palatable and thoroughly cooked condition suitable for serving as a porridge, and the following description of my method will serve to enable any one skilled in the art of milling such cereals as oats to prepare my food product.

Prepared oat groats, freed of hulls and foreign matter, are washed with water and allowed to remain in the water until they have become thoroughly moistened, say ten to thirty minutes. They are then drained or centrifuged to remove surplus water. These groats which now contain 18% to 22% moisture are placed in a Johnson cooker, or any suitable pressure cooker, and a further quantity of 8% to 10% of water is added to the groats in the cooker. The vent of the sheet iron barrel or drum of the cooker is now closed and simultaneously the barrel is revolved slowly, say ten to twenty revolutions per minute as steam is admitted through small perforations through the central axis of the barrel, which consists of an iron pipe of suitable size to support the barrel of the machine and its load of cereal. This axial pipe is connected with the steam supply through "stuffing boxes" which permit the revolving motion of the barrel. These stuffing boxes as well as the other parts of this machine are well known in the industries.

Steam is admitted at such a rate as to give a pressure within the barrel or drum of ten to twelve pounds per square inch above atmospheric pressure. This revolving motion and steaming under pressure is continued one hour to one hour and forty minutes, depending on the variety and special properties of the groats. At the end of this operation the steam supply is cut off and then at the opposite end of the axial pipe the steam is withdrawn, first by gradually releasing the valve until the pressure within the barrel is near atmospheric pressure when a pump is attached which further reduces the pressure gradually. A sudden reduction of the pressure is avoided, the time required to exhaust the steam of the barrel being about thirty minutes.

At the end of this operation the vent of the barrel is opened and the cereal discharged into a bin where it remains about twelve hours, for what I designate tempering of the grain, that is, the product is allowed to continue the changes initiated by the cooking under pressure to reduce the starches to digestible conditions and produce changes in the proteins, producing or tending to produce polypeptides. The cereal thus prepared then is run between heavy iron or steel rolls with smooth surfaces revolving in close proximity to each other and rolling together at equal speeds, such as are commonly used in milling for flaking cereals.

These rolls flatten the grains into flakes which are of a coherent nature. These flakes drop on to an endless belt moving just beneath the rolls and are transported directly into a heated drying atmosphere, and after drying to a suitable moisture content are ready for packing for the trade.

Moreover, instead of rolling my cooked cereal into flakes I may dry the groat to 6% to 10% moisture after the so-called tempering process and reduce to granulations by means of corrugated rolls revolving at different speeds to each other, such as are commonly used in milling cereals.

My process is especially designed for oats but with slight modifications in the cooking and rolling is suitable for treating other cereals, such as wheat or rye. The resulting flakes or granules, as the case may be, are in a thoroughly cooked condition and to prepare them for serving on the table requires only to mix with water or milk and such condiments or flavors as are required by the taste and bringing the same to or near a boiling temperature.

Having thus fully described my said invention, what I claim as new and desire to secure by Letters Patent, is:

1. A process of cooking cereals by means of steam under pressure, tempering, and rolling into flakes.

2. The process of cooking oat groats or other cereals in a moist condition and in the presence of moisture in a pressure cooker, maintaining pressure within the cooker by means of a steam spray, gradually removing the steam from the cooker, storing the grain in a bin for a tempering period and rolling the same into flakes.

3. The process of moistening and steaming oat groats or other cereals in a pressure cooker, storing in a bin for a tempering period, and reducing the same to a granular condition between corrugated rolls or to a condition of flakes by rolling between smooth rolls.

In witness whereof, I have hereunto set my hand and seal at Detroit, Michigan, this 25th day of June, A. D. nineteen hundred and nineteen.

GEORGE BECK. [L. S.]

Witnesses:
C. M. Rich,
Louis C. Thierry.